US006483798B1

(12) United States Patent
Wu

(10) Patent No.: US 6,483,798 B1
(45) Date of Patent: Nov. 19, 2002

(54) TILT ANGLE ADJUSTING MECHANISM FOR OPTICAL PICKUP HEAD

(75) Inventor: Tsung-Hung Wu, Yong Kang (TW)

(73) Assignee: Acute Applied Technologies, Inc., Hsinchu (TW)

( * ) Notice: Subject to any disclaimer, the term of this patent is extended or adjusted under 35 U.S.C. 154(b) by 0 days.

(21) Appl. No.: 09/535,463

(22) Filed: Mar. 23, 2000

(51) Int. Cl.⁷ .............................................. G11B 21/02
(52) U.S. Cl. ...................................................... 369/219
(58) Field of Search .............................. 369/219, 244, 369/249, 215

(56) References Cited

U.S. PATENT DOCUMENTS

| | | | | |
|---|---|---|---|---|
| 5,111,088 A | * | 5/1992 | Fujino | 310/12 |
| 5,375,115 A | * | 12/1994 | Shimegi et al. | 369/244 |
| 5,761,182 A | * | 6/1998 | Jeon | 369/219 |
| 5,764,618 A | * | 6/1998 | Kim | 369/219 |
| 5,768,248 A | * | 6/1998 | Lee | 369/219 |
| 5,933,406 A | * | 8/1999 | Ikegame | 369/247 |
| 5,982,735 A | * | 11/1999 | Tsai | 369/219 |
| 5,995,478 A | * | 11/1999 | Park | 369/219 |
| 6,192,023 B1 | * | 2/2001 | Seo | 369/219 |
| 6,285,649 B1 | * | 9/2001 | Bessho et al. | 369/219 |

* cited by examiner

*Primary Examiner*—David Davis
(74) *Attorney, Agent, or Firm*—W. Wayne Liauh

(57) ABSTRACT

The present invention provides a tilt angle adjusting mechanism for adjusting the tilt angle of the optical axis of a pickup head relative to the optical disc. The pickup head is furnished with an elongated hole, a slot or an L-shape base, several pre-loaded pressing elements and adjusting elements for a three-point mounting on two guide rods. The adjusting elements make the optical pickup head rotatably on two axes so as to adjust the tilt angle. An adaptive mechanism can also be incorporated for adjusting the tilt angle of the pickup head without modifying the original structure of an optical disc driver.

16 Claims, 4 Drawing Sheets

TILT ANGLE ADJUSTING MECHANISM FOR OPTICAL PICKUP HEAD

BACKGROUND OF THE INVENTION

1. Field of the Invention

The present invention generally relates to a mechanism for an optical disc driver, and more particularly to a tilt angle adjusting mechanism for adjusting the tilt angle of an optical axis of the pickup head relative to the optical disc.

2. Related Art

The drivers for optical disc become more and more popular, and even indispensable in the current information industry. For example, drivers for reading CD ROM or DVD ROM has now been well matured.

The spindle motor in an optical disc driver has to be precisely positioned in order to keep the data bearing surface of the optical disc, e.g., CD or DVD, perpendicular to the optical axis of the objective lens in the optical pickup head, so that the information data can be correctly read. Generally, the tilt angle of a spindle motor (which rotates the optical disc) relative to the optical pickup head or the guide rods (which support the pickup head) has to be well adjusted to the right position. The conventional tilt angle adjusting mechanisms can be classified into two kinds:

1) by adjusting the spindle motor. In this manner, the adjusting mechanism which piles on the spindle motor will occupy a certain space, easily pierce holes on the circuit board mounted adjacent to it, increase the complexity of mechanical design, increase the difficulty of adjustment, and restrain a compact design of optical disc driver;

2) by adjusting the guide rods. This manner will cause the transmission mechanism of the optical pickup head fail when the pickup head is driven via a gear-tack transmission.

Please refer to FIG. 1 which is a partial exploded view of a conventional optical disc driver. The optical disc driver mainly includes a spindle motor 40, an optical pickup head 10 and a sheet metal base 20. The spindle motor 40 is fixed on a motor base 43 which is further fixed to the well planed sheet metal base 20. An objective lens 11 is positioned on the optical pickup head 10 which is movably mounted on two guide rods 30a and 30b. The guide rods 30a, 30b support two ends of optical pickup head 10 in which one end is furnished with a round hole 100 and the other end is a square slot 101. Ends of the guide rods 30a, 30b are fixed to the sheet metal base 20 via mounts 21a, 21b, 21c and 21d. The paralleling and positioning of the guide rods 340a, 30b are determined by the precision and positioning of the mounts 21a, 21b, 21c, 21d and the sheet metal base 20.

The motor base 43 of the spindle motor 40 is fixed with one point to the sheet metal base 20 via a stud 44 and a fixing screw 45, and with other two points movably linked to the sheet metal base 20 via adjusting screws 46a, 46b which will change the distance and tilt angle of the motor base 43 relatively to the sheet metal base 20 so as to adjust the tilt angle of the spindle motor 40 relatively to the optical pickup head 10 for correctly reading data from an unshown optical disc. But, the aforesaid adjusting mechanism causes problems of occupying an extra space adding to the spindle motor 40, and the screws 45, 46a, 46b may pierce holes on a circuit board mounted adjacent to the spindle motor 40.

SUMMARY OF THE INVENTION

The present invention mainly provides a tilt angle adjusting mechanism for adjusting a tilt angle of an optical axis of a pickup head relative to the optical disc so that the data stored on the optical disc can be correctly read by a laser beam coming from and returning to the pickup head.

Another object of the present invention is to provide an adaptive mechanism for adjusting the tilt angle of a pickup head without modifying the original structure of the optical disc driver.

The tilt angle adjusting mechanism according to the present invention, for adjusting the optical axis of the pickup head perpendicular to the plane of the optical disc, includes:

a first and a second guide rods, parallel to each other and located in a X-Y plane where the rods extend in the Y axis, for carrying the optical pickup head;

an optical pickup head, contacting the first guide rod at a first and a second points along the Y-axis, and contacting the second guide rod at a third point;

a first and a second adjusting elements normally contact respectively at the first and the second points to the first guide rod;

a third adjusting element normally contact at the third point to the second guide rod;

the first and the second adjusting elements are movable for adjusting the pickup head rotating on the X-axis; and the third adjusting element is movable for adjusting the pickup head rotating on the Y-axis.

The three contacting points can be designed with some suitable shapes, such as long round holes, square holes, L-shape base or square slots, and incorporated with pressing elements which provide pre-loadings to the guide rods, for contacting the guide rods with the adjusting elements. The adjusting element can be a stud with a round end, or a screw pushing a steel ball, for a point contact to the guide rod in order to attain the tilt angle adjustment. An adaptive mechanism can also be provided for adjusting the tilt angle of a pickup head without modifying the original structure of an optical disc driver.

BRIEF DESCRIPTION OF THE DRAWINGS

The above objects and advantages of the present invention will become more apparent from the following detailed description of the present invention when taken in conjunction with the accompanying drawings.

DETAILED DESCRIPTION OF PREFERRED EMBODIMENTS

The present invention provides a tilt angle adjusting mechanism for an optical disc driver. The mechanism can easily adjust the tilt angle of a pickup head to well position the optical axis of the pickup head relatively to the optical disc so that the data stored on the optical disc can be correctly read by a laser beam.

Figure 1:
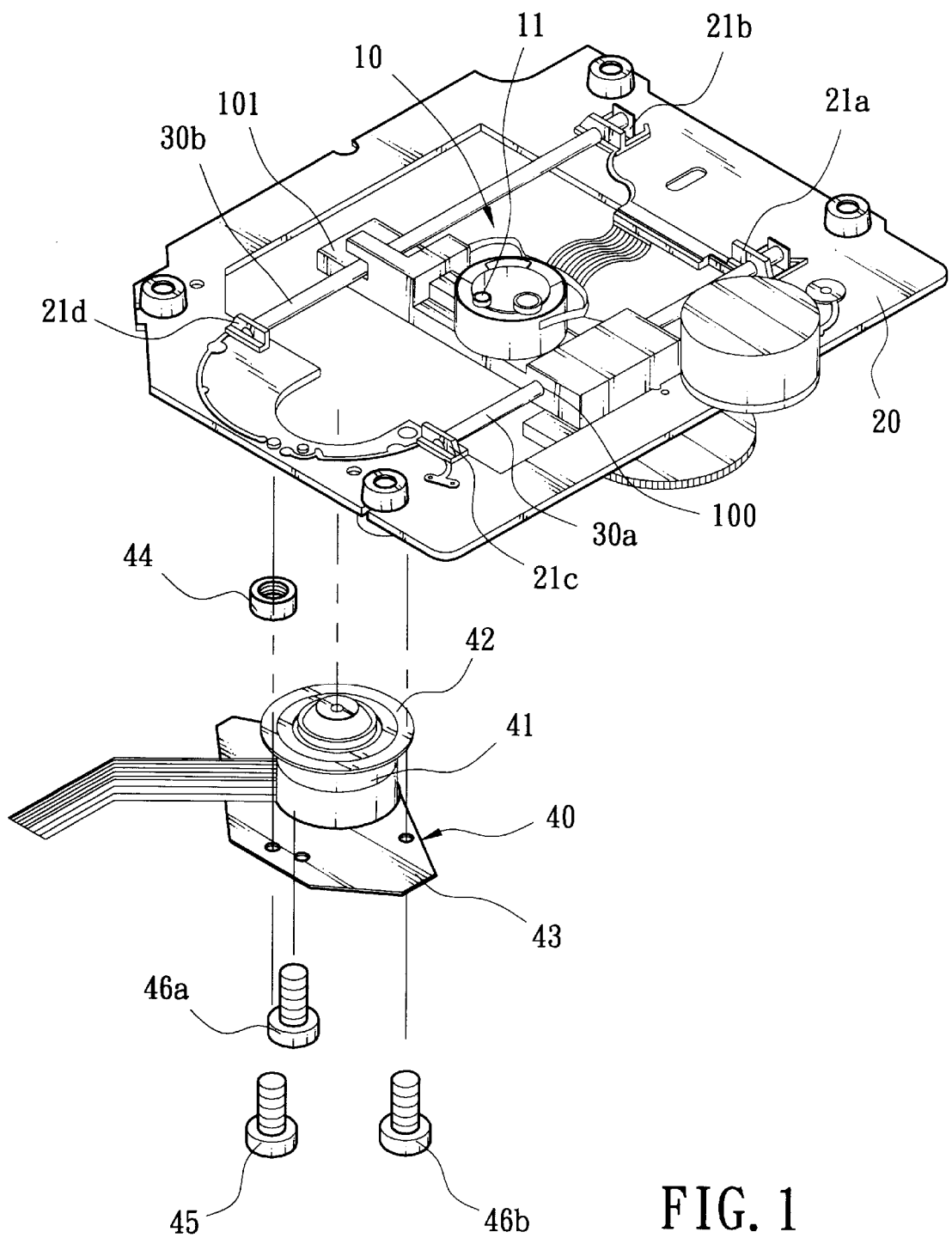
FIG. 1 is a partial exploded view of a conventional optical disc driver having a spindle motor tilt angle adjusting mechanism.
Figure 2:
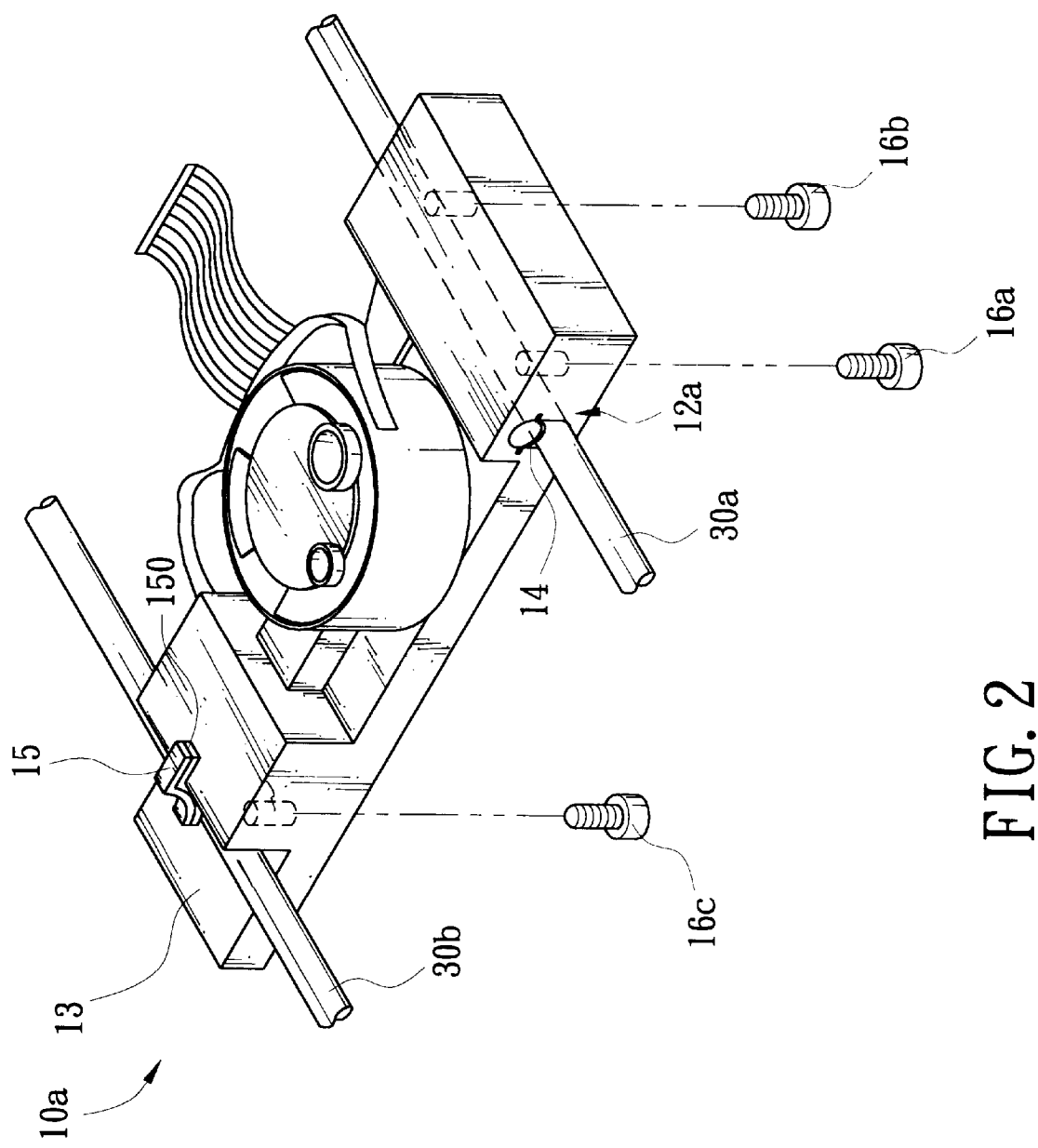
FIG. 2 is a constructional view of a tilt angle adjusting mechanism of an optical disc driver according to the present invention.

As shown in FIG. 2, a tilt angle adjusting mechanism according to the present invention includes two guide rods 30a, 30b and an optical pickup head 10a. Please refer to the coordinates X-Y-Z, the first and second guide rods 30a, 30b are in the X-Y plane and are parallel to the Y-axis. The first guide rod 30a is called the main transmission axle, while the second guide rod 30b is called the secondary transmission axle.

The optical pickup head 10a contacts with the first guide rod 30a at a first and a second points along the Y-direction, and contacts with the second guide rod 30b at a third point. The axle hole for supporting one end of the pickup head 10a is furnished with an elongated hole, such as a long round hole 12a, to limit movement of the pickup head 10a relative to first guide rod 30a in the X direction, but allow movement in the Z direction which is perpendicular to the X-Y plane.

Another end of the pickup head 10a is furnished with an L-shape base 13 to allow movement of the pickup head relative to the second guide rod 30b in the Z direction.

At the first and the second points, there are a first and a second adjusting elements normally contact with one point respectively to the first guide rod. At the third point, a third adjusting element normally contacts with one point to the second guide rod. For a better adjustment function, the third point is preferably located in the middle perpendicular line to the cross line over the first and the second points.

The adjusting elements, such as screws 16a, 16b, 16c, are made of abrasion-resistant materials so as to prevent themselves from being worn-out by contacting the guide rods 30a, 30b. The contacting ends of the screws 16a, 16b, 16c contacting the guide rods 30a, 30b are formed into round ends for point contacts to attain the function of tilt angle adjustment.

There are several elastic elements to make the first guide rod 30a contacting the first and the second adjusting elements, and make the second guide rod 30b contacting the third adjusting element. For example, several springs 14 are mounted in the long round holes 12a for pressing the first guide rod 30a, and a spring 15 is mounted on the L-shape base 13 for pressing the second guide rod 30b. There can further be an abrasion-resistant member, such as an engineering plastic piece, 150 formed with the spring 15 to contact the guide rod 30b and decrease the abrasion. The contact point of the abrasion-resistant member 150 can also be a round end or a steel ball for the same function.

Figure 3:
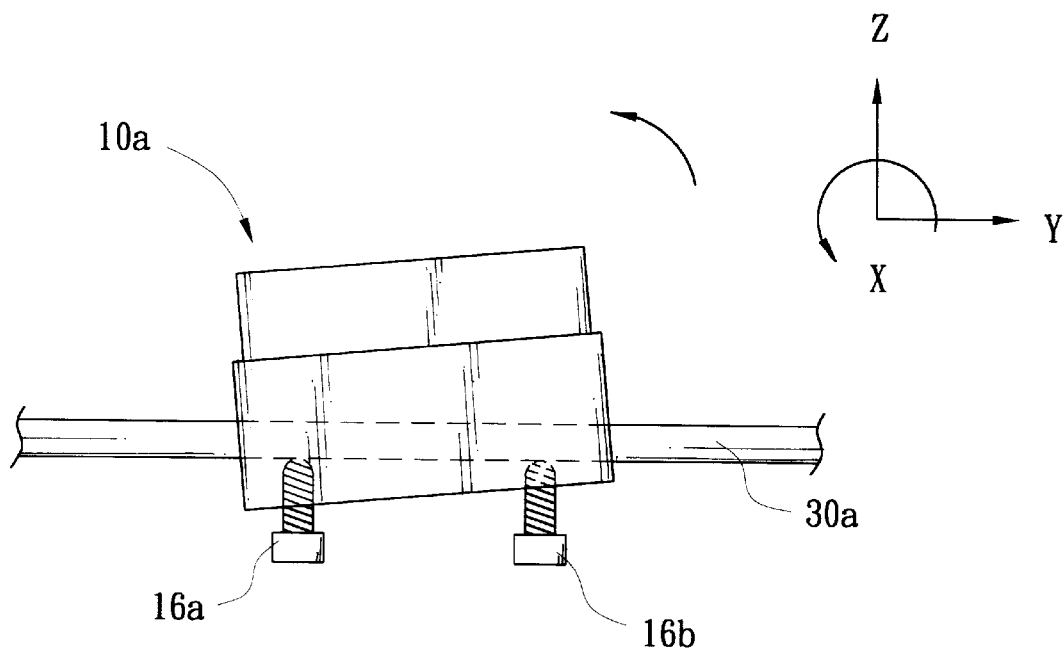
FIG. 3 is a side view of the tilt angle adjusting mechanism of FIG. 2, showing the optical pickup head being adjusted to rotate on the X-axis.

Referring to FIG. 3 which is a side view of the tilt angle adjusting mechanism of FIG. 2, showing the optical pickup head 10a being adjusted to rotate on the X-axis. In this manner, the first and the third adjusting elements are fixed, but the second adjusting element is adjusted; or the second and the third adjusting elements are fixed, but the first adjusting element is adjusted. The optical pickup head 10a is then adjusted to rotate on the X-axis, and the X-axis tilt angle adjustment is attained.

Figure 4:
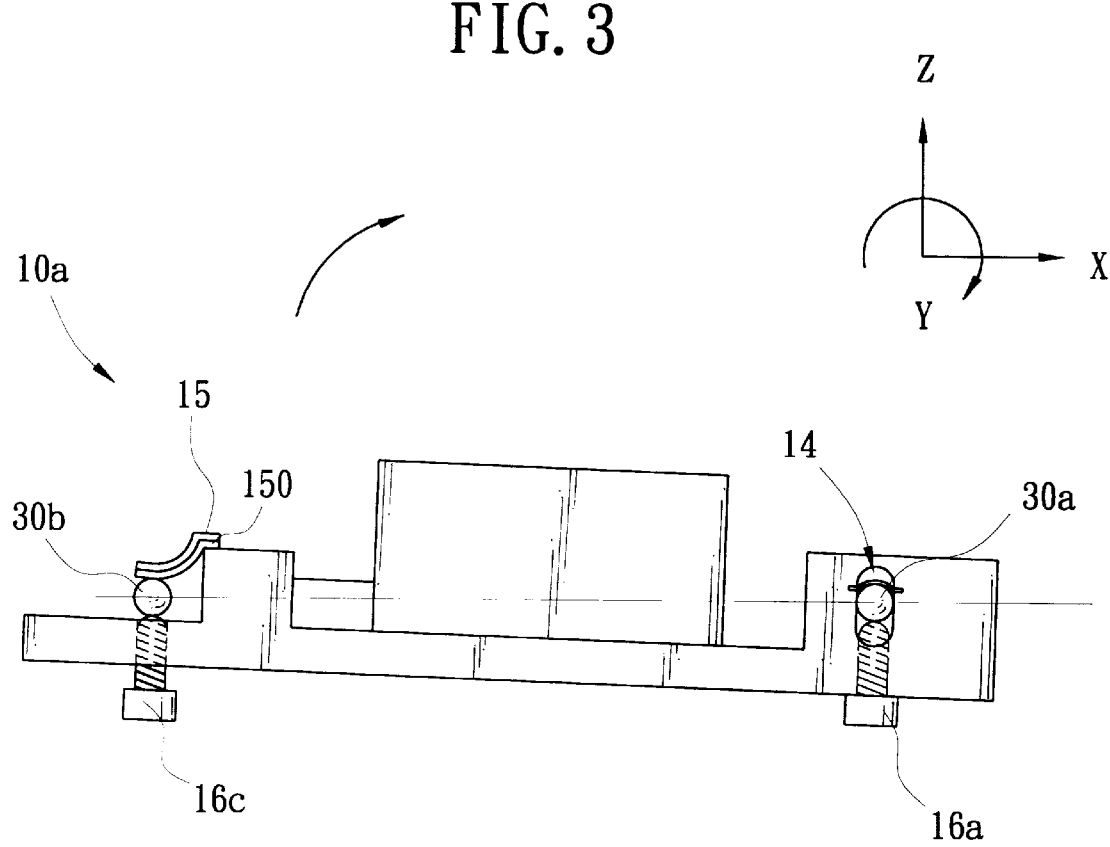
FIG. 4 is a side view of the tilt angle adjusting mechanism of FIG. 2, showing the optical pickup head being adjusted to rotate on the Y-axis.

Referring to FIG. 4 which is a side view of the tilt angle adjusting mechanism of FIG. 2, showing the optical pickup head 10a being adjusted to rotate on the Y-axis. In this manner, the first and the second adjusting elements are fixed, but the third adjusting element is adjusted; or the third adjusting element is fixed, but the first and the second adjusting elements are adjusted. The optical pickup head 10a is then adjusted to rotate on the Y-axis, and the Y-axis tilt angle adjustment is attained.

Figure 5:
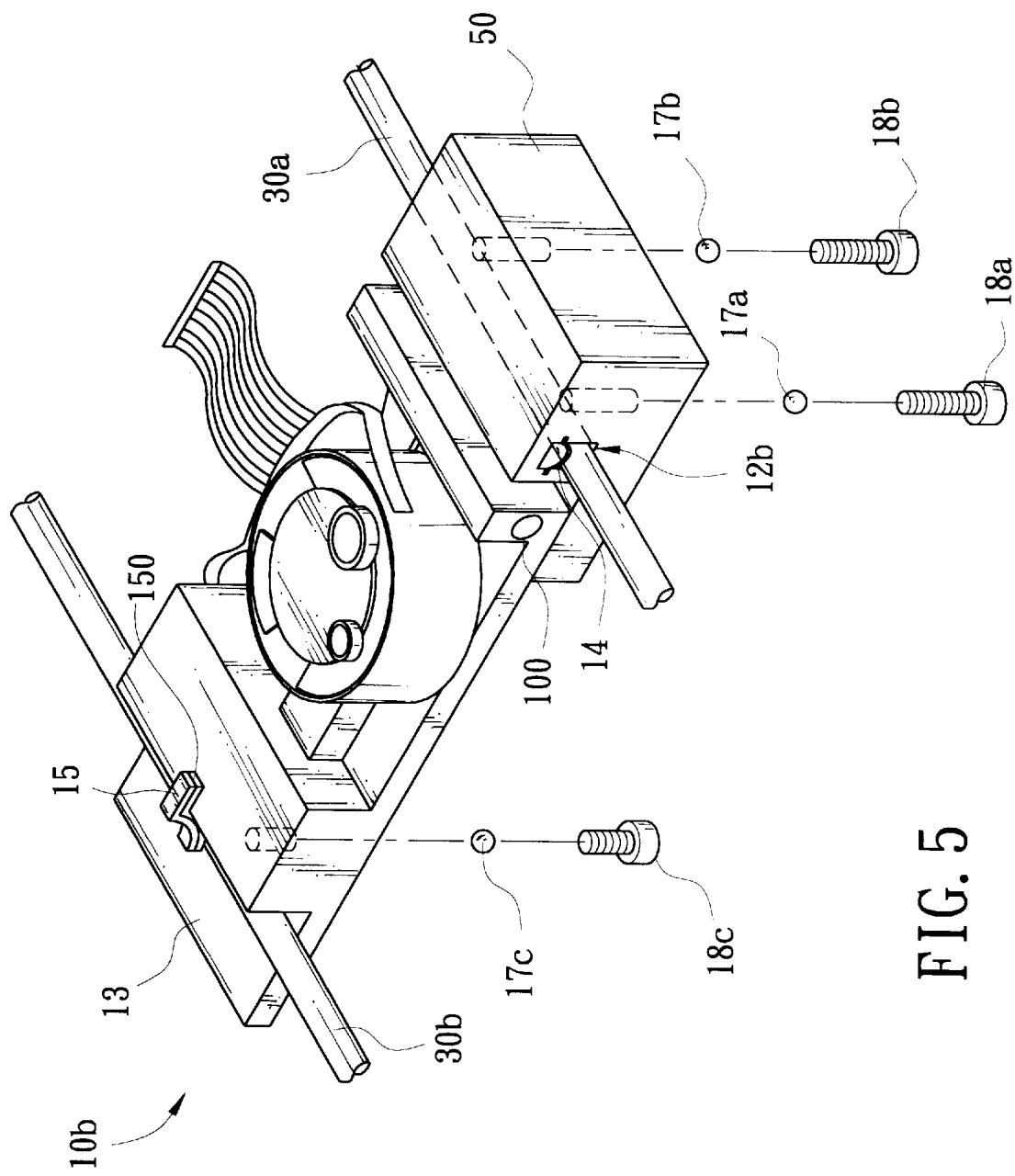
FIG. 5 is a constructional view of a second embodiment of a tilt angle adjusting mechanism according to the present invention.

FIG. 5 shows a second embodiment of the present invention in which an adaptive mechanism 50 is provided for adjusting the tilt angle of a pickup head without modifying the original structure of an optical disc driver. The adaptive mechanism 50 is fastened with unshown screws to the optical pickup head 10b. One end of the optical pickup head 10b is formed with an L-shape base 13 to contact the second guide rod 30b. The adjusting element is composed of a screw 18c and a steel ball 17c. The screw 18c pushes the steel ball 17c contacting the second guide rod 30b so as to adjust the tilt angle.

The original axle hole 100 of the pickup head 10b is left unused, and replaced by a rectangular hole 12b of the adaptive mechanism 50 for receiving the first guide rod 30a. Several springs 14 are mounted in the rectangular holes 12b for pressing the first guide rod 30a. The adjusting elements are composed of screws 18a, 18b and steel balls 17a, 17b. The screws 18a, 18b push the steel balls 17a, 17b contacting the first guide rod 30a so as to adjust the tilt angle.

The tilt angle adjusting mechanism for an optical disc driver according to the present invention has the following advantages:

a) by using the three point adjustment, the pickup head on the guide rods can be easily adjusted to a desired tilt angle, so that the laser beam can correctly pick up the data on the optical disc;

b) no excessive space is needed for the adjusting mechanism, and no piercing on the circuit board will occur; and c) since the guide rods are always fixed, the transmission mechanisms for the pickup head will not be influenced during the tilt angle adjustment, therefore, no mismatch of transmission will occur.

While the invention has been described in its preferred embodiments, it is to be understood that the words which have been used are words of description rather than limitation and that changes within the purview of the appended claims may be made without departing from the true scope and spirit of the invention.

What is the claimed is:

1. A tilt angle adjusting mechanism for an optical disc driver to adjust a pickup head comprising:

a first and a second guide rods positioned in an X-Y plane and being parallel to the Y-axis;

an optical pickup head, contacting the first guide rod at a first and a second points along the Y-axis, and contacting the second guide rod at a third point;

a first and second adjusting elements normally contacting the first guide rod at the first and second points respectively; and a third adjusting element normally contacting at the third point to the second guide rod;

an elongated hole having a generally elliptically shaped oblong cross-section extending along the Y-axis for the first guide rod to pass therethrough and allow the optical pickup head at the first and the second adjusting points to be moved along a Z-axis perpendicular to the X-Y plane by the first and the second adjusting elements respectively to thereby allow the optical pickup head to rotate about the X-axis; and an L-shape base for supporting the second guide rod and receiving the third adjusting element so as to allow the optical pickup head at the third adjusting point to be moved along the Z-axis by the third adjusting element, to thereby allow the optical pickup head to rotate about the Y-axis.

2. A tile angle adjusting mechanism for an optical disc driver as recited in claim 1 wherein of the optical pickup head at the first and the second adjusting points is further furnished with a pre-loaded pressing element to maintain the first guide rod contacting the first and second adjusting elements.

3. A tile angle adjusting mechanism for an optical disc driver as recited in claim 1 wherein the optical pickup head at the third adjusting point is further furnished with a pre-loaded pressing element to maintain the second guide rod contacting the third.

4. A tilt angle adjusting mechanism for an optical disc driver as recited in claim 1 wherein the optical pickup head at the third adjusting point is furnished with a square slot for the second guide rod to go through and allow the optical pickup head at the third adjusting point to be moved in a Z-axis perpendicular to the X-Y plane by the third adjusting element.

5. A tilt angle adjusting mechanism for an optical disc driver as recited in claim 1 further comprises a plurality of pre-loaded pressing elements to maintain the first guide rod contacting the first and second adjusting elements, and maintain the second guide rod contacting the third adjusting element.

6. A tilt angle adjusting mechanism for an optical disc driver as recited in claim 5 wherein the pre-loaded pressing elements are springs.

7. A tilt angle adjusting mechanism for an optical disc driver as recited in claim 5 wherein the pre-loaded pressing elements are further incorporated with abrasion-resistant members to decrease abrasion between the pressing elements and the first and second guide rods.

8. A tilt angle adjusting mechanism for an optical disc driver as recited in claim 1 wherein at least one of the first, the second and the third adjusting elements is a screw with a round end for contacting the guide rod.

9. A tilt angle adjusting mechanism for an optical disc driver as recited in claim 1 wherein at least one of the first, the second and the third adjusting elements is a screw incorporated with a steel ball, the screw pushes the steel ball contacting the guide rod so as to adjust the tilt angle.

10. A tilt angle adjusting mechanism for an optical disc driver to adjust a pickup head comprising:

a first and a second guide rods positioned in an X-Y plane and being parallel to the Y-axis;

an optical pickup head, contacting the second guide rod at a third point;

a third adjusting element normally contacting at the third point to the second guide rod;

an adaptive mechanism, fixed to the optical pickup head, for contacting the first guide at a first point and a second point along the Y-axis;

a first and second adjusting elements normally contacting the first guide rod at the first and second points, respectively; and an elongated hole having a generallY elliptically shaped oblong cross-section extending among the Y-axis for the first guide rod to pass therethrough and allow the optical pickup head at the first and the second adjusting points to be moved along a Z-axis perpendicular to the X-Y plane by the first and the second adjusting elements respectively, to thereby allow the optical pickup head to rotate about the X-axis; and an L-shape base for supporting the second guide rod and receiving the third adjusting element so as to allow the optical pickup head at the third adjusting point to be moved along the Z-axis by the third adjusting element to thereby allow the optical pickup head to rotate about the Y-axis.

11. A tilt angle adjusting mechanism for an optical disc driver as recited in claim 10 wherein the optical pickup head at the first and second adjusting points is further furnished with a pre-loaded pressing element to maintain the first guide rod contacting the first and second adjusting elements.

12. A tilt angle adjusting mechanism for an optical disc driver as recited in claim 10 further comprises a plurality of pre-loaded pressing elements to maintain the first guide rod contacting the first and second adjusting elements, and maintain the second guide rod contacting the third adjusting element.

13. A tilt angle adjusting mechanism for an optical disc driver as recited in claim 12 wherein the pre-loaded pressing elements are springs.

14. A tilt angle adjusting mechanism for an optical disc driver as recited in claim 12 wherein the pre-loaded pressing elements are further incorporated with abrasion-resistant members to decrease abrasion between the pressing elements and the first and the second guide rods.

15. A tilt angle adjusting mechanism for an optical disc driver as recited in claim 10 wherein at least one of the first, the second and the third adjusting elements is a screw with a round end for contacting the guide rod.

16. A tilt angle adjusting mechanism for an optical disc driver as recited in claim 10 wherein at least one of the first, the second and the third adjusting elements is a screw incorporated with a steel ball, the screw pushes the steel ball contacting the guide rod so as to adjust the tilt angle.

* * * * *